United States Patent [19]

Planchock et al.

[11] 3,970,463

[45] July 20, 1976

[54] GLASSES AND GLASS-CERAMICS AND PRODUCTS MADE THEREFROM

[75] Inventors: Jerry L. Planchock, Toledo; Daniel R. Stewart, Maumee; Thomas W. Brock, Toledo, all of Ohio

[73] Assignee: Owens-Illinois, Inc., Toledo, Ohio

[22] Filed: Apr. 26, 1974

[21] Appl. No.: 464,713

Related U.S. Application Data

[60] Division of Ser. No. 229,959, Feb. 28, 1972, Pat. No. 3,841,950, which is a continuation-in-part of Ser. No. 146,664, May 25, 1971, abandoned.

[52] U.S. Cl. .................................. 106/39.7; 106/52
[51] Int. Cl.² ......................... C03C 3/22; C03C 3/04
[58] Field of Search ............................. 106/39.7, 52

[56] References Cited
UNITED STATES PATENTS

| | | | |
|---|---|---|---|
| 2,920,971 | 1/1960 | Stookey | 106/39.7 |
| 3,157,522 | 11/1964 | Stookey | 106/39.7 |
| 3,241,985 | 3/1966 | Kuwayama | 106/39.7 |
| 3,282,712 | 11/1966 | Tashiro et al. | 106/39.7 |
| 3,428,513 | 2/1969 | Denman | 106/39.7 |
| 3,489,577 | 1/1970 | Tashiro et al. | 106/39.7 |
| 3,676,097 | 7/1972 | Plumat et al. | 106/39.7 |
| 3,779,856 | 12/1973 | Pirooz | 106/39.7 |
| 3,788,865 | 1/1974 | Babcock et al. | 106/39.7 |

*Primary Examiner*—Helen M. McCarthy
*Assistant Examiner*—Mark Bell
*Attorney, Agent, or Firm*—Charles S. Lynch; E. J. Holler

[57] ABSTRACT

Thermally crystallizable glasses and glass-ceramics having a narrow critical range of compositions coming within the $SiO_2$-$Al_2O_3$-$Li_2O$ and $SiO_2$-$Al_2O_3$-$Li_2O$-$ZnO$ systems and glass-ceramic products made therefrom including heat exchangers, such as regenerators and recuperators used with gas turbine engines, thermal reactors and catalytic reactors for the gaseous exhausts of combustion engines, and other products which are dimensionally stable at temperatures of at least 1500°F. and above, have very low coefficients of thermal expansion, and have a modulus of rupture of at least about 10,000 psi which is retained when operating at temperatures of at least 1500°F., over an extended period of time.

35 Claims, 1 Drawing Figure

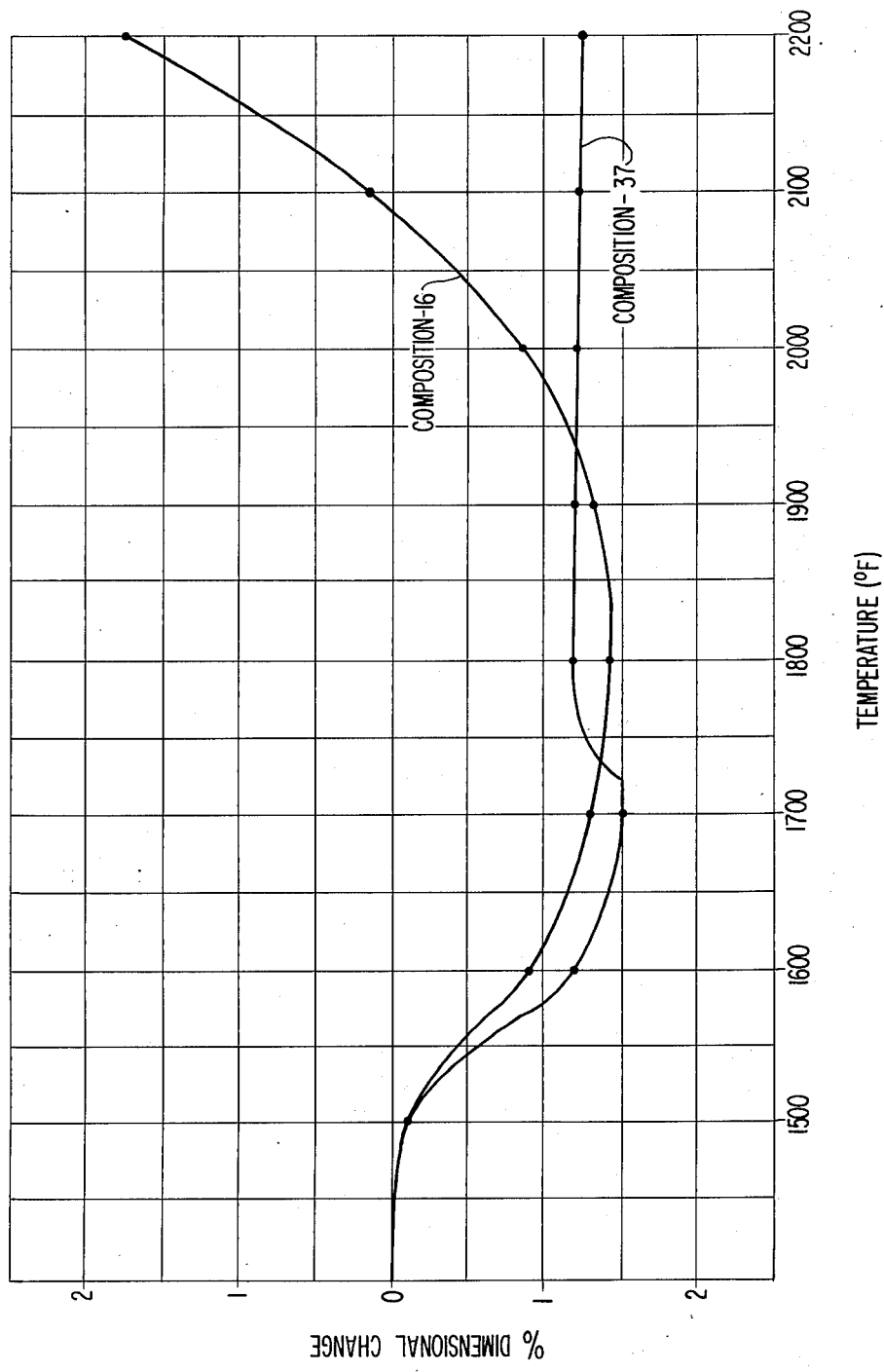

GLASSES AND GLASS-CERAMICS AND PRODUCTS MADE THEREFROM

This is a division of application Ser. No. 229,959, now U.S. Pat. No. 3,841,950, filed Feb. 28, 1972 which is relied upon and the entire disclosure and specification of which is hereby incorporated by reference. Which in turn is a continuation-in-part of copending U.S. Pat. application Ser. No. 146,664, filed May 25, 1971 now abandoned.

In U.S. Pat. application Ser. No. 30,859 filed Apr. 22, 1970, and in U.S. Pat. application Ser. No. 146,665 filed May 25, 1971, both of which are assigned to Owens-Illinois, Inc., assignee of the present application (the disclosure of each of which is incorporated herein by reference and thus forms a part of this application), there are disclosed several embodiments of heat exchangers, namely recuperators and regenerators for use with gas turbine engines for various automotive vehicles, including automobiles, trucks, busses, and the like, together with a full disclosure as to how to make such heat exchangers.

In each embodiment of the disclosures, the regenerative heat exchanger comprises a matrix of integrally fused tubes forming a series of smooth longitudinal parallel passageways therethrough, wherein the walls defining the passageways are nonporous and consist essentially of an inorganic crystalline oxide ceramic material having an average lineal coefficient of thermal expansion of about $-12$ to $+12 \times 10^{-7}/°C.$ ($0°-300°C.$). The walls of the passageways also have a maximum thickness of about 0.03 to 0.002 inches through portions of such walls common to adjacent fused tubes. The ratio of the diameter of the passageways to the aforementioned thickness is at least 3 and the matrix has an open frontal area of at least 60%. Furthermore, the matrix walls have a thermal conductivity at 400°C. of less than 0.01 cal/cm/sec/cm²/°C.

In the aforementioned U.S. Pat. application Ser. No. 30,859 and in the later filed application Ser. No. 146,665 which is a continuation-in-part of Ser. No. 30.859, there is disclosed a recuperator comprising a matrix comprising an assembly of integrally fused tubes arranged in a plurality of layers of tubes superimposed one above the other in successive parallel planes, the tubes within each plane being essentially parallel to each other and transverse to the tubes in adjacent layers, the tubes in each layer forming a series of longitudinal parallel passageways through the matrix. The composition and size of the tubes is substantially the same as that of the aforementioned regenerator tubes. Because of the arrangement of the layers of tubes in the recuperator, the open frontal or cross-sectional area of each face of the matrix containing passageways is at least 32% of the cross-sectional area across each face.

In U.S. Pat. application Ser. No. 127,127 filed Mar. 23, 1971, in the names of Andrew W. Zmuda and Yu K. Pei and entitled "Exhaust Reactor for Combustion Engine " (also assigned to the common assignee) the disclosure of which is also incorporated herein and forms a part of this application, there is disclosed an integral monolithic exhaust reactor for a combustion engine including a first reaction zone comprising an elongated tube for receiving the flow of hot glass effluents from a combustion engine. A matrix comprising a plurality of parallel tubes extends longitudinally of and is disposed about the first tubular reaction zone and is bonded thereto. The parallel tubes are bonded together in the matrix and form a rigid support for the elongated tube. A plurality of the matrix tubes disposed about the elongated tube have open passageways which are in communication with the elongated tube and receive the flow of gas effluents therefrom. These matrix tubes define a second reaction zone for the gas effluents and connect with outlet means to permit passage of gas therefrom.

During their operation, the regenerators, recuperators, and exhaust reactors described in the aforementioned pending patent application are subjected to extremely high temperatures of about 1,500° F. and more for extended periods of time. When the various components of such devices are formed of an inorganic crystalline oxide ceramic material, such material must have thermal stability to withstand such high temperatures, i.e., its coefficient of thermal expansion, its modulus of rupture, its structural dimensions, and other properties must not change to any appreciable extent upon exposure to such high temperatures over extended periods of time.

The coefficient of thermal expansion must be low so that any rapid heating or cooling of the ceramic material components will not cause any build-up of thermal stresses and result in breakage of the component.

The modulus of rupture must be high so that such components can withstand the wear and tear inherent in normal operations of the gas turbines and automotive vehicles. Such strength must be maintained at the high temperatures of at least 1,500° F. to which such components are normally subjected.

Heat exchangers, such as regeneraters and recuperators used in gas turbine engines for trucks, operate at temperatures as high as 1,500° F. and must be able to withstand this temperature for at least 1,000 to 2,000 hours without shattering during the operation of the truck. Automobile turbine heat exchangers will operate at temperatures as high as 1,900° F., while catalytic and thermal reactors which ensure substantially total combustion of exhaust gas effluents of internal combustion engines will be subjected to temperatures of about 1,000° – 1,900° F. Thus, all components of these devices must retain their strengths while being subjected to these temperatures over extended periods of time and, most importantly, must retain their thermal stability during operation, particularly dimensional stability. Expansion of less than 250 parts per million when exposed to temperatures of at least 1,500° F. for a period of 2,000 hours should be a property of any glass-ceramic component utilized in these heat exchangers and reactors, and preferably such expansion should be less than 100 ppm with, of course, the ideal being an expansion of 50 ppm or less at these temperatures over these times.

It has now been found that certain thermally crystallizable glasses having certain narrow, critical composition limits within the broad area of $Li_2O$-$Al_2O_3$-$SiO_2$ and $Li_2O$-$Al_2O_3$-$SiO_2$-$ZnO$ systems, when shaped into specific structures and then thermally in situ crystallized to an at least partially crystalline ceramic (also referred to as glass-ceramic), impart to such structures excellent thermal stability at high temperatures of at least 1,500°F while simultaneously imparting a high modulus of rupture. Furthermore, such structures have a coefficient of thermal expansion within the range of $-12$ to $+12 \times 10^{-7}/°C.$ ($0°-700°C$). Many of the compositions have a coefficient of thermal expansion of less than −3 to +3×10⁻⁷/°C. and some are within the range of −0.5 to +0.5×10⁻⁷/°C.(0°–700°C).

Thermally crystallizable glass compositions of the invention coming within the $SiO_2$-$Al_2O_3$-$Li_2O$ system consist essentially of the following ingredients present within the indicated ranges, expressed in weight percent, and also within the indicated molar ratios.

| Ingredient | Weight Percent |
|---|---|
| $SiO_2$ | 55 – 80 |
| $Al_2O_3$ | 12 – 27 |
| $Li_2O$ | 3.2 – 7.6 |
| Nucleating Agent | 3 – 9 | wherein the nucleating agent is either $TiO_2$ or a mixture of $TiO_2$ with $ZrO_2$. Usually, in order to obtain the desired properties, the compositions will consist of 98–100 weight percent $SiO_2$+$Al_2O_3$+$Li_2O$+ the specified nucleating agents. When the $SiO_2$/$Al_2O_3$ molar ratio is from 4 to less than 5, the $Li_2O$/$Al_2O_3$ molar ratio is from 0.75 to 0.97; when the $SiO_2$/$Al_2O_3$ molar ratio is from 5 to 7.5, the $Li_2O$/$Al_2O_3$ molar ratio is from 0.65 to 0.97; when the $SiO_2$/$Al_2O_3$ molar ratio is more than 7.5 and less than 9, then the $Li_2O$/$Al_2O_3$ molar ratio is from 0.8 to 0.97; and when the $SiO_2$/$Al_2O_3$ molar ratio is more than 9 and up to 10, the $Li_2O$/$Al_2O_3$ molar ratio is from 0.87 to 0.97. More usually, the weight percent ranges of $SiO_2$ and $Al_2O_3$ in these compositions are 62.8–80 $SiO_2$ and 12.7–26.7 $Al_2O_3$.

When the nucleating agent is a mixture of $TiO_2$+$ZrO_2$ then the $ZrO_2$ should not exceed 3% and preferably should be less than 3% i.e. up to 2.8% by weight and preferably at least 0.5% by weight, and the total amount of $TiO_2$ plus $ZrO_2$ is at least 3 weight percent up to about 9 weight percent.

While more than about 9 weight percent $TiO_2$ or total nucleating agent may be used, there is no advantage in using such large amounts because the properties of the resulting glass-ceramics are not improved. Further, raising the $TiO_2$ levels has the result of raising the thermal expansion coefficient of the glass-ceramic. It is critical to have at least 3 weight percent nucleating agent in the composition. When less than 3 weight percent total nucleants are present, the nucleation rate is so slow that the heat treatment cycles are excessively long and the strength of the glass-ceramic which is formed is decreased. When $ZrO_2$ is present in an amount of 3 weight percent or more it raises the liquidus of the glass melt and makes more difficult the processing of the glass into products.

Refining agents, such as antimony tri-oxide, arsenic oxide, or the like, may be present in the composition in an amount up to about 0.5 weight percent if such ingredients are deemed necessary for fining the glasses.

In the preferred embodiment of the invention, the thermally crystallizable glass comes within the following composition ranges wherein the sole essential ingredients, expressed in weight percent, are as follows, and wherein the molar ratios are as indicated:

| Ingredient | Weight Percent |
|---|---|
| $SiO_2$ | 63 – 78.5 |
| $Al_2O_3$ | 13.8 – 23 |
| $Li_2O$ | 3.5 – 6.5 |
| Nucleating Agent | 3 – 9 | wherein the $SiO_2$/$Al_2O_3$ molar ratio is from 5 to less than 9. The nucleating agent is as defined above and when the $SiO_2$/$Al_2O_3$ molar ratio is from 7.5 to less than 9, the $Li_2O$/$Al_2O_3$ molar ratio is from 0.87 to 0.97; and when the $SiO_2$/$Al_2O_3$ molar ratio is from 5 to less than 7.5, the $Li_2O$/$Al_2O_3$ molar ratio is from 0.75 to 0.97. Representative compositions coming within the scope of the present invention are set forth in Table I.

TABLE I

| Composition No. | 1 | 2 | 3 | 4 | 5 | 6 | 7 | 8 | 9 | 10 | 11 |
|---|---|---|---|---|---|---|---|---|---|---|---|
| $SiO_2$ | 78.3 | 78.90 | 75.85 | 76.45 | 74.8 | 73.00 | 70.85 | 70.85 | 70.75 | 70.80 | 70.85 |
| $Al_2O_3$ | 14.2 | 13.65 | 16.10 | 16.20 | 17.15 | 18.45 | 20.05 | 20.05 | 19.75 | 20.05 | 20.00 |
| $Li_2O$ | 3.95 | 4.00 | 4.50 | 3.80 | 4.50 | 5.00 | 5.55 | 5.40 | 5.55 | 5.55 | 5.45 |
| $TiO_2$ | 1.45 | 1.45 | 1.45 | 1.45 | 1.45 | 1.45 | 1.45 | 1.40 | 1.40 | 1.40 | 1.40 |
| $ZrO_2$ | 1.60 | 1.60 | 1.60 | 1.60 | 1.60 | 1.60 | 1.60 | 1.60 | 1.60 | 1.60 | 1.60 |
| $Sb_2O_3$ | 0.30 | 0.30 | 0.30 | 0.32 | 0.30 | 0.30 | 0.30 | 0.30 | 0.30 | 0.30 | 0.30 |
| $Na_2O$ | 0.10 | | 0.10 | 0.10 | 0.10 | 0.10 | 0.10 | 0.30 | 0.10 | 0.10 | 0.10 |
| $K_2O$ | | | | | | | | | | | 0.20 |
| $Fe_2O_3$ | | | | | | | | | | 0.45 | 0.10 |
| Molar Ratio $SiO_2$/$Al_2O_3$ | 10.00 | 9.80 | 8.00 | 8.00 | 7.40 | 6.70 | 6.00 | 6.00 | 6.00 | 6.00 | 6.00 |
| Molar Ratio $Li_2O$/$Al_2O_3$ | 0.95 | 0.97 | 0.95 | 0.80 | 0.90 | 0.95 | 0.95 | 0.95 | 0.95 | 0.95 | 0.95 |

| Composition No. | 12 | 13 | 14 | 15 | 16 | 17 | 18 | 19 | 20 | 21 | 22 |
|---|---|---|---|---|---|---|---|---|---|---|---|
| $SiO_2$ | 70.75 | 68.00 | 71.05 | 71.30 | 71.50 | 69.35 | 67.10 | 72.00 | 68.45 | 64.00 | 64.85 |
| $Al_2O_3$ | 20.00 | 22.25 | 20.10 | 20.15 | 20.20 | 19.60 | 18.95 | 20.25 | 23.25 | 25.35 | 25.60 |
| $Li_2O$ | 5.35 | 6.20 | 5.30 | 5.00 | 4.75 | 4.55 | 4.45 | 4.20 | 4.75 | 7.10 | 6.00 |
| $TiO_2$ | 1.40 | 1.45 | 1.45 | 1.45 | 1.45 | 6.00 | 9.00 | 1.45 | 1.45 | 1.45 | 1.45 |
| $ZrO_2$ | 1.60 | 1.60 | 1.60 | 1.60 | 1.60 | | | 1.60 | 1.60 | 1.60 | 1.60 |
| $Sb_2O_3$ | 0.30 | 0.30 | 0.30 | 0.30 | 0.30 | 0.30 | 0.30 | 0.30 | 0.30 | 0.30 | 0.30 |
| $Na_2O$ | 0.50 | 0.10 | 0.10 | 0.10 | 0.10 | 0.10 | 0.10 | 0.10 | 0.10 | 0.10 | 0.10 |
| $K_2O$ | | | | | | | | | | | |
| $Fe_2O_3$ | | | | | | | | | | | |
| Molar Ratio $SiO_2$/$Al_2O_3$ | 6.00 | 5.20 | 6.00 | 6.00 | 6.00 | 6.00 | 6.00 | 6.00 | 5.00 | 4.30 | 4.30 |
| Molar Ratio $Li_2O$/$Al_2O_3$ | 0.95 | 0.95 | 0.90 | 0.85 | 0.80 | 0.80 | 0.80 | 0.70 | 0.70 | 0.95 | 0.80 |

Whenever the glass-ceramic falls outside the range of ingredients set forth above, either the coefficient of thermal expansion is too high or the dimensional stability at high temperatures, and/or the strengths of such glass-ceramics during high temperature operations are poor. To show the criticality in the $Li_2O/Al_2O_3$ molar ratio reference is made to Table II wherein several compositions of the invention having different $Li_2O/Al_2O_3$ ratios were compared with two compositions which were outside the range of the invention because of lower ratios. All compositions were melted, drawn as ¼ inch rods from the melt, and the glass rods heated to form glass-ceramic rods.

The glass rods were heated to their nucleating temperature at a rate of 300°F per hour, and held at that temperature for 8 hours. They were then heated to the finishing temperatures set forth in Table II and held there for two hours. All rods were then cooled at 25°F per hour to 1,500°F and then cooled to room temperature at the furnace rate of about 300°F per hour. All compositions had a nucleating temperature of 1,350°F except Compositions 16 and 26 which had nucleating temperatures of 1,375° and 1,300°F, respectively.

The foregoing heat treatment schedule was used to form the glass-ceramic rods referred to in all subsequent tables of this application, and the nucleating temperatures of the particular compositions will be set forth in the discussions regarding each table.

The following batch materials were mixed and melted in a furnace to form the glass of Example 16:

| Ingredients | Parts by Weight |
| --- | --- |
| Ottawa silica | 3580 |
| A-10 Alumina | 1016 |
| Titanox | 73 |
| Lithium Zirconate | 108.1 |
| Sodium Antimonate | 20.5 |
| Lithium Carbonate | 488 |
| Lithium Chloride | 47.8 |
| Lithium Nitrate | 27.6 |

The sodium antimonate, lithium chloride and lithium nitrate are present as refining agents for the glass melt. The batch was melted at 2,970°F. for a period of 23 hours and mechanically stirred during this time. From the disclosure of the batch of the foregoing Example, those in the glass art can readily make the glasses coming within the present embodiment of the invention.

TABLE II

| Composition No. | 23 | 24 | 7 | 14 | 15 | 16 | 19 | 25 | 26 |
| --- | --- | --- | --- | --- | --- | --- | --- | --- | --- |
| Ingredients (Moles) | | | | | | | | | |
| $Li_2O$ | 1.05 | 1.0 | 0.95 | 0.9 | 0.85 | 0.8 | 0.7 | 0.6 | 0.5 |
| $Al_2O_3$ | 1 | 1 | 1 | 1 | 1 | 1 | 1 | 1 | 1 |
| $SiO_2$ | 6 | 6 | 6 | 6 | 6 | 6 | 6 | 6 | 6 |
| Heat Treatment Temp. °F(Time,Hrs) | 2220(2) | —* | 2100(2) | 2200(2) | 2200(2) | 2200(2) | 2100(2) | 2200(2) | 2200(2) |
| Dimensional Stability, change in ppm: | | | | | | | | | |
| at 1500°F (Time,Hrs) | +490(10) | | +27(100) | | | +35(100) | −13(250) | | |
| at 1900°F (Time,Hrs) | | | −196(2000) | −104(2000) | −182(2000) | +205(2000) | −104(500) | | +76(100) |
| Modulus of Rupture (psi, Room Temp.) | 14,600 | | 11,300 | 10,500 | 10,700 | 11,500 | 12,200 | | 4300 |
| Coefficient of Thermal Expansion $\times 10^{+7}$ (0–700°C.) | +3.8 | | +1.6 | +1.0 | +1.1 | +1.6 | +1.8 | | +8.8 |

*Samples broke. At $Li_2O/Al_2O_3$ molar ratios of 1, the resulting glass could not be heat treated to a glass-ceramic since the samples all broke during the heat treating steps.

The $Li_2O/Al_2O_3$ molar ratios of 1.05 in Composition 23 resulted in the glass-ceramics having very poor dimensional stability at 1,500°F. The expansion of +490 parts per million after only 10 hours at 1,500° F. showed that with longer times the expansion would be considerably greater and the glass-ceramic would not be satisfactory where the product made therefrom would be subjected to temperatures of at least 1,500°F. for extended periods of time. Compositions 24 also was unacceptable since the glass-ceramic broke during the heat treatment. When the $Li_2O/Al_2O_3$ molar ratio was within the range of 0.95 to 0.70, the resulting glass ceramic had good high temperature properties including good dimensional stability at 1,900° F. However, when the molar ratio of $Li_2O/Al_2O_3$ was as low as 0.6 and lower as in Compositions 25 and 26, the resulting glass-ceramics had very low strengths. The samples of Example 25 were very weak at the intermediate heat treatment step of 1,800° to 2,000° F. and were very unsatisfactory. Compositions of the invention, however, had modulus of rupture values in excess of 10,000 psi and are suitable for use at high temperatures over long periods of time because of these strengths. The glass-ceramic of Composition 26 had a coefficient of thermal expansion of 18.2 × $10^{-7}$(0°–300°C). Such compositions are unsuitable for the purposes of this invention.

Compositions 20, 22, and 29, which are representative of those coming within the scope of the present invention, were compared with other compositions falling outside of the invention because of too low a silica content and a resulting low $SiO_2/Al_2O_3$ ratio. Again, the compositions were melted, glass rods of one-fourth inch diameter were drawn out therefrom and then heat treated according to the schedule set forth in connection with the Table II compositions and the finishing temperatures given in Table III. The nucleating temperatures were 1,250° F. for Composition 28; 1,300° F. for Compositions 22 and 27; and 1,350° F. for Compositions 20 and 29. Various properties of the resulting glass-ceramics were then measured.

TABLE III

| Composition No. | 22 | 27 | 28 | 20 | 29 |
| --- | --- | --- | --- | --- | --- |
| Ingredients (Moles) | | | | | |
| $Li_2O$ | 0.95 | 0.95 | 0.7 | 0.7 | 0.8 |

TABLE III-continued

| Composition No. | 22 | 27 | 28 | 20 | 29 |
|---|---|---|---|---|---|
| $Al_2O_3$ | 1 | 1 | 1 | 1 | 1.0 |
| $SiO_2$ | 4.3 | 3.2 | 4.3 | 5 | 4.3 |
| Heat Treatment Temp.°F(Time,Hrs.) | 2100(2) | 2100(2) | 2100(2) | 2200(2) | 2100(2) |
| Dimensional Stability Parts Per Million (Time, Hrs.) | | | | | |
| at 1500°F (hrs) | −15(2000) | −298(100) | −79(250) | −8(250) | |
| at 1900°F (hrs) | | | | +37(250) | |
| Modulus of Rupture (psi room temp) | 11,200 | | 6,100 | 13,800 | 11,300 |
| Coefficient of Thermal Expansion $\alpha \times 10^{+7}$ (0–700°C) | +6.8 | +5.3 | −5.9 | +4.2 | 7.1 |

Composition 22 gives excellent high temperature and good strength properties. When the $SiO_2/Al_2O_3$ molar ratio is 3.2 as in composition 27, however, the forming properties of the glass are very poor because of the low silica content and the resulting glass-ceramic also has very poor dimensional stability at 1,500°F. The expansion after 100 hrs. indicates that the glass-ceramics will expand considerably more after longer times at this high temperature, thus making it very unsatisfactory for purposes of this invention. As seen from Composition 28, a $Li_2O/Al_2O_3$ molar ratio of 0.7 is too low when the $SiO_2/Al_2O_3$ ratio is 4.3 and results in a glass ceramic having very low strength values. However, with the same low 0.7 $Li_2O/Al_2O_3$ molar ratio, a good glass ceramic is obtained when the $SiO_2/Al_2O_3$ ratio is 5, as shown by Composition 20.

Composition 29, which has a lower $Li_2O/Al_2O_3$ molar ratio than Composition 22, still produced a glass ceramic having a high modulus of rupture and a low expansion coefficient, comparable to that of Composition 22.

The effect of $Li_2O$ on compositions having a high $SiO_2/Al_2O_3$ ratio was ascertained and the results are set forth in Table IV. Again, each composition had its batch ingredients melted, and a rod having a one-fourth inch diameter was drawn therefrom and heat treated according to the nucleating and crystallization rates set forth above, using the finishing temperature set forth in Table IV. The nucleating temperature was 1,350°F. for Compositions 3, 30 and 31 and 1,375°F for Compositions 1 and 4.

Compositions 1, 3 and 4 exhibit acceptable high temperature properties. On the other hand, Compositions 30 and 31 are not suitable for the purpose of this invention because of their high thermal expansion properties and their low strengths. Thus, the 0.7 $Li_2O/Al_2O_3$ ratio found acceptable at other $SiO_2/Al_2O_3$ molar ratios is unacceptable at a $SiO_2/Al_2O_3$ ratio of 10. Further, the glass-ceramic of Composition 30 had a coefficient of thermal expansion of $200.4 \times 10^{-7}$ (0°–300°C) while that of Composition 31 had a coefficient of 21.1 over the same 0°–300°C range. Both compositions are unsuitable for purposes of this invention because of these very poor expansion properties.

It should be emphasized that for purposes of this invention, the thermally crystallizable glass compositions must consist of the three essential ingredients, $SiO_2$, $Al_2O_3$ and $Li_2O$ plus the nucleating agent(s), all falling within the narrow critical ranges set forth above, both as to weight percent of each ingredient and to molar ratios of $Li_2O/Al_2O_3$ and $SiO_2/Al_2O_3$. Ingredients and impurities such as $Na_2O$, $K_2O$, fluorides and the like which are present in substantial amounts in the prior art $Li_2O$-$SiO_2$-$Al_2O_3$ compositions cannot be tolerated above certain very minor levels and preferably should be omitted altogether from the compositions of the present invention. The effect of $Na_2O$, $K_2O$ and F on the dimensional stability of the glass-ceramic compositions is set forth in Table V. All of the glass ceramics were formed from glass rods which were then heat treated at 2,100°F for 2 hours.

TABLE IV

| Composition No. | 4 | 3 | 1 | 30 | 31 |
|---|---|---|---|---|---|
| Ingredients (Moles) | | | | | |
| $Li_2O$ | 0.8 | 0.95 | 0.95 | 0.6 | 0.8 |
| $Al_2O_3$ | 1 | 1 | 1 | 1 | 1 |
| $SiO_2$ | 8 | 8 | 10 | 10 | 10 |
| Heat Treatment Temp.°F (Time,Hrs.) | 2100(2) | 2100(2) | 2100(2) | 2100(2) | 2100(2) |
| Dimensional Stability Parts Per Million (Time, Hrs.) | | | | | |
| at 1500°F (hrs) | +71(100) | +96(100) | +48(100) | | +14(250) |
| at 1900°F (hrs) | | | | −76(250) | |
| Strengths (psi, room temp) | 8,700 | 11,600 | 10,700 | 5,100 | 5,100 |
| Coefficient of Thermal Expansion $\alpha \times 10^{+7}$ (0–700°C) | −2.7 | −2.8 | −4.9 | +12.7 | +12.4 |

TABLE V

| Composition No. | 7 | 8 | 12 | 11 | 32 | 33 | 9 | 10 | 34 | 35 |
|---|---|---|---|---|---|---|---|---|---|---|
| Ingredients (Wt.%) | | | | | | | | | | |
| $Na_2O$ | 0.1 | 0.3 | 0.5 | 0.1 | 0.5 | 0.8 | 0.1 | 0.1 | 0.1 | 0.1 |
| $K_2O$ | — | — | — | 0.2 | 0.2 | 0.4 | — | — | — | — |
| $Fe_2O_3$ | — | — | — | — | — | — | 0.45 | 0.1 | — | — |
| $F_2$ | — | — | — | — | — | — | — | — | 0.3 | 0.2 |
| Dimensional Stability Parts Per Million (Time, Hrs.) | | | | | | | | | | |
| at 1500°F–100 hrs. | +27 | 0 | — | — | +613 | +307 | −19 | −9 | +750 | * |
| at 1500°F–2000 hrs. | −130 | −11 | −6 | −3 | — | — | +5 | −74 | — | — |
| at 1900°F–2000 hrs. | −32 | +330 | +434 | +987 | — | — | +168 | −78 | — | — |

*Composition 35 was unsatisfactory since it crazed on its surface, no matter what heat treatment was used.

As evident from the data in Table V, $Na_2O$ and $K_2O$ have a very detrimental effect on the dimensional stability at high temperatures of the compositions of the present invention. For example, compositions 32 and 33 have a 0.95:1:6 molar ratio of $Li_2O$-$Al_2O_3$-$SiO_2$ and contain different levels of $Na_2O$+$K_2O$, namely 0.7 and 1.2 total weight percent, respectively. While compositions 8, 11 and 12 are dimensionally unstable at 1,900°F, they do have satisfactory stability at 1,500°F for 2,000 hours and can be used in those devices wherein a temperature substantially over 1,500°F will not be encountered during normal operation, such as in a regenerator for a gas turbine engine used for trucks.

To achieve good dimensional stability at 1,500°F, the $Na_2O$ should not be present in an amount more than 0.5 weight percent and the $K_2O$ should not be present in an amount of more than 0.5 weight percent, nor should the combined $Na_2O$+$K_2O$ exceed 0.5 weight percent. To obtain good stability at temperatures of 1,900°F no more than about 0.25 percent $Na_2O$ or $K_2O$ can be present, either by themselves or as a mixture.

$Fe_2O_3$ when present as an impurity in an amount of less than 0.5 weight percent has no detrimental effect on the compositions of the invention. However, fluoride ion, which is known by the art to increase the strength of glass-ceramic compositions when present in small amounts, adversely affects the properties of the compositions of the present invention. Composition 35 contained 0.2 weight percent F and could not be heat treated without the formation of surface scale because of the crazing which took place. Composition 34 had very poor dimensional stability, namely a change of 750 ppm after only 100 hours at 1,500°F. That the effect was due to the F, even though ZnO was present in the composition will become evident from the further disclosure of another embodiment of the invention where it will be demonstrated that ZnO does not have a detrimental effect on dimensional stability at 1,500°F, but, instead, makes the glass-ceramic stronger. Fluorine should be kept to less than 0.1 weight percent and preferably is absent.

It is critical in this first embodiment of the invention to have the crystallizable glass and the glass-ceramic consist essentially solely of the three essential ingredients plus the nucleating agent coming within the weight amounts and molar ratios defined above. It is imperative that the inpurities be kept to an absolute minimum. While no impurities should be present it is recognized that it is almost impossible to make glass without some impurities unless only pure materials were used in the batch. This is not possible on any commercial scale because of the costs. However, care should be maintained in selecting batch materials for making the glasses to insure that impurities in the resulting glasses are kept to as low a figure as possible. It has been found that when petalite is used as a batch ingredient, for instance, that the resulting glass-ceramics do not have the desired properties of the glass-ceramics of the present invention. Accordingly, petalite cannot be used as a batch ingredient in making the glasses and glass-ceramics of the present invention.

In such other embodiment of the invention it has been found that thermally crystallizable glass compositions consisting essentially of $SiO_2$, $Al_2O_3$, $Li_2O$ and ZnO, wherein each ingredient is within a narrow critical range and also within certain critical molar ratios, can be formed into articles which when heat treated to thermally in situ crystallize them to an at least partially crystalline ceramic, also referred to as a glass-ceramic, exhibit good thermal stability, good flexural strengths and low coefficients of thermal expansion. The presence of the ZnO vastly improves the strengths of the glass-ceramics to almost double the strengths of the compositions of the first embodiment of the invention discussed above. Strengths within the range of about 13,000–20,000 psi and more can be readily obtained.

Such compositions coming within the scope of this second embodiment of the invention consist essentially of the following ingredients present within the indicated weight percent ranges and also within the specific molar ratios:

| Ingredient | Weight Percent |
|---|---|
| $SiO_2$ | 52 – 78.4 |
| $Al_2O_3$ | 12.8 – 27.5 |
| $Li_2O$ | 2.4 – 7 |
| ZnO | 0.25 – 6.7 |
| Nucleating Agent | 3 – 9 | wherein the (ZnO + $Li_2O$/$Al_2O_3$) molar ratio is ≤ 1 and when the ($SiO_2$/$Al_2O_3$) molar ratio is from 4 to less than 5 then the ($Li_2O$/$Al_2O_3$) molar ratio is from 0.55–0.91 and the (ZnO/$Li_2O$) molar ratio is from 0.06 to 0.5;

when the ($SiO_2$/$Al_2O_3$) molar ratio is from 5 to 8;

then the ($Li_2O$/$Al_2O_3$) molar ratio is from 0.55 to 0.93 and the (ZnO/$Li_2O$) molar ratio is from 0.04 to 0.5; and when the ($SiO_2$/$Al_2O_3$) molar ratio is from more than 8 and up to 9, then the ($Li_2O$/$Al_2O_3$) molar ratio is from 0.8 to 0.93 and the (ZnO/$Li_2O$) molar ratio is from 0.04 to 0.5.

Usually, in order to obtain the desired properties, the compositions will consist of 98–100 weight percent $SiO_2$ + $Al_2O_3$ + $Li_2O$ + ZnO + the specified nucleating agents.

The nucleating agent can be $TiO_2$, $ZrO_2$ or a mixture of $TiO_2$ and $ZrO_2$. If $TiO_2$ alone is used, it should be in an amount of at least 3.2 weight percent. If $ZrO_2$ is used with $TiO_2$, it should not exceed 3% and preferably should be less than 3%, i.e. from about 0.5 to about 2.8 weight percent. In the latter event, sufficient $TiO_2$ must be present to at least give a total of 3 weight percent nucleating agent mixture in the composition.

Representative compositions coming within the scope of the second embodiment of the invention are set forth in Table VI.

and this shrinkage accompanies the crystallization of the high quartz solid solution phases in the temperature range of 1,350°F to 1,600°F. At temperatures between 1,600°F and 2,000°F, the high quartz phase undergoes a solid state transformation to the keatite solid solution phase. This phase change in Composition 37 is accompanied by a 0.3% lineal expansion at about 1,725°F. At temperatures above 2,000°F, Composition 16 expands by about 2.5% but Composition 37, which contains ZnO, does not change.

The behavior of these compositions at high tempera-

TABLE VI

| Composition No. | 36 | 37 | 38 | 39 | 40 | 41 | 42 | 43 |
|---|---|---|---|---|---|---|---|---|
| Ingredients (Weight Percent) | | | | | | | | |
| $SiO_2$ | 70.25 | 73.00 | 72.00 | 72.60 | 70.2 | 71.15 | 72.05 | 70.25 |
| $Al_2O_3$ | 19.85 | 17.65 | 18.80 | 18.85 | 18.4 | 18.50 | 18.85 | 19.85 |
| ZnO | 1.70 | 1.70 | 1.80 | 1.70 | 3.7 | 2.50 | 1.0 | 1.70 |
| $Li_2O$ | 4.65 | 4.15 | 3.85 | 3.30 | 4.3 | 4.30 | 4.60 | 4.65 |
| $TiO_2$ | 1.45 | 1.40 | 1.45 | 1.45 | 1.45 | 1.45 | 1.40 | 2.40 |
| $ZrO_2$ | 1.60 | 1.60 | 1.60 | 1.60 | 1.60 | 1.60 | 1.60 | 0.60 |
| $Sb_2O_3$ | 0.30 | 0.30 | 0.30 | 0.30 | 0.30 | 0.30 | 0.30 | 0.30 |
| $Na_2O$ | 0.10 | 0.10 | 0.10 | 0.10 | 0.1 | 0.10 | 0.10 | 0.10 |
| $K_2O$ | — | — | — | — | — | — | — | — |
| $Fe_2O_3$ | — | — | — | — | — | — | — | — |
| Molar Ratios | | | | | | | | |
| $SiO_2/Al_2O_3$ | 6.0 | 7.0 | 6.5 | 6.5 | — | 6.5 | 6.5 | 6.0 |
| $Li_2O/Al_2O_3$ | 0.8 | 0.8 | 0.7 | 0.6 | — | 0.8 | 0.76 | 0.8 |
| $ZnO/Li_2O$ | 0.14 | 0.14 | 0.16 | 0.18 | — | 0.21 | .086 | 0.14 |
| $ZnO + Li_2O/Al_2O_3$ | 0.91 | 0.91 | 0.81 | 0.71 | — | 0.97 | 0.84 | 0.91 |
| Composition No. | 44 | 45 | 46 | 47 | 48 | 49 | 50 | 51 |
| Ingredients (Weight Percent) | | | | | | | | |
| $SiO_2$ | 72.95 | 72.85 | 70.75 | 70.75 | 73.25 | 72.70 | 68.50 | 61.65 |
| $Al_2O_3$ | 17.30 | 17.60 | 17.10 | 17.10 | 19.00 | 18.85 | 16.55 | 25.50 |
| ZnO | 1.70 | 1.70 | 1.65 | 1.65 | 0.85 | 1.70 | 1.60 | 1.80 |
| $Li_2O$ | 4.10 | 4.15 | 4.00 | 4.00 | 3.35 | 3.30 | 3.85 | 4.50 |
| $TiO_2$ | 1.40 | 1.40 | 6.0 | 3.00 | 1.45 | 1.45 | 9.0 | 1.45 |
| $ZrO_2$ | 1.60 | 1.60 | — | 3.00 | 1.60 | 1.60 | — | 1.60 |
| $Sb_2O_3$ | 0.30 | 0.30 | 0.30 | 0.30 | 0.30 | 0.30 | 0.30 | 0.30 |
| $Na_2O$ | 0.10 | 0.10 | 0.10 | 0.10 | 0.10 | — | 0.10 | 0.10 |
| $K_2O$ | — | 0.20 | — | — | — | — | — | — |
| $Fe_2O_3$ | 0.45 | — | — | — | — | — | — | — |
| Molar Ratios | | | | | | | | |
| $SiO_2/Al_2O_3$ | 7.0 | 7.0 | 7.0 | 7.0 | 6.5 | 6.5 | 7.0 | 4.3 |
| $Li_2O/Al_2O_3$ | 0.8 | 0.8 | 0.8 | 0.8 | 0.6 | 0.6 | 0.8 | 0.6 |
| $ZnO/Li_2O$ | 0.14 | 0.14 | 0.14 | 0.14 | 0.08 | 0.18 | 0.14 | 0.13 |
| $ZnO + Li_2O/Al_2O_3$ | 0.91 | 0.91 | 0.91 | 0.91 | 0.65 | 0.71 | 0.91 | 0.68 |
| Composition No. | 52 | 53 | 54 | 55 | 56 | 57 | 58 | 59A |
| Ingredients (Weight Percent) | | | | | | | | |
| $SiO_2$ | 70.42 | 73.35 | 59.80 | 75.30 | 73.55 | 75.85 | 72.30 | 72.55 |
| $Al_2O_3$ | 18.40 | 19.15 | 29.00 | 16.00 | 19.20 | 16.10 | 18.85 | 18.90 |
| ZnO | 4.40 | 0.60 | 2.55 | 1.40 | 0.35 | 0.70 | 0.85 | 0.60 |
| $Li_2O$ | 3.23 | 3.35 | 5.10 | 3.75 | 3.35 | 3.80 | 4.45 | 4.40 |
| $TiO_2$ | 1.45 | 1.45 | 1.45 | 1.45 | 1.45 | 1.45 | 1.45 | 1.45 |
| $ZrO_2$ | 1.60 | 1.60 | 1.60 | 1.60 | 1.60 | 1.60 | 1.60 | 1.60 |
| $Sb_2O_3$ | 0.30 | 0.30 | 0.30 | 0.30 | 0.30 | 0.30 | 0.30 | 0.30 |
| $Na_2O$ | 0.10 | 0.10 | 0.10 | 0.10 | 0.10 | 0.10 | 0.10 | 0.10 |
| $K_2O$ | — | — | — | — | — | — | — | — |
| $Fe_2O_3$ | — | — | — | — | — | — | — | — |
| Molar Ratios | | | | | | | | |
| $SiO_2/Al_2O_3$ | 6.5 | 6.5 | 3.5 | 8 | 6.5 | 8 | 6.5 | 6.5 |
| $Li_2O/Al_2O_3$ | 0.6 | 0.6 | 0.6 | 0.8 | 0.6 | 0.8 | 0.8 | 0.8 |
| $ZnO/Li_2O$ | 0.5 | 0.06 | 0.18 | 0.14 | 0.04 | 0.07 | 0.07 | 0.05 |
| $ZnO + Li_2O/Al_2O_3$ | 0.90 | 0.64 | 0.71 | 0.91 | 0.62 | 0.86 | 0.86 | 0.84 |

The $Li_2O$-$ZnO$-$Al_2O_3$-$SiO_2$ compositions of this embodiment of the invention have better heat treatment characteristics than the aforementioned $Li_2O$-$Al_2O_3$-$SiO_2$ compositions of the invention. At heat treatment temperatures of 2,000°-2,200°F, the latter compositions undergo a dimensional expansion which is caused by grain growth and the development of voids or pores at the grain boundaries. The change in length during heat treatment of Compositions 16 and 37 is shown in FIG. 1. Both compositions undergo an initial shrinkage tures gives the ZnO-containing compositions of the invention an advantage over the compositions of the invention which do not contain ZnO. With the latter compositions, the heating rates in the heat treatment cycles must be slowed down in temperature ranges where dimensional changes occur, particularly when an article such as a matrix or assembly for a regenerator, recuperator, thermal exhaust reactor and the like, is being heat treated to thermally in situ crystallize it to form the integral monolithic glass ceramic structure. If the product being heat treated has a temperature gradient, parts of it will tend to change dimensions before other of its parts and mechanical stress resulting in fracture will occur. Thus it takes about a week to heat treat and thus crystallize a product having a substantial thickness of several inches or more made from Composition 16 and less than two days to heat treat and crystallize the same product made from Composition 37.

Furthermore, it is easier to predict and control the dimensions of a product made from a glass composition which undergoes very small dimensional changes in the final stage of the heat treatment cycle as it becomes a glass-ceramic product.

Another important advantage of the ZnO-containing compositions of the present invention is that they are significantly stronger than the compositions of the invention which do not contain ZnO. The room temperature modulus of rupture of the former is at least 13,000 and is often 20,000 psi or higher as compared to approximately 10,000 psi for the latter.

$Na_2O$, $K_2O$, $F_2$ and other impurities, when present in the ZnO-containing compositions of the present embodiment of the invention also adversely affect the dimensional stability of the glass-ceramic formed therefrom. Thus, as little as 0.3 weight percent $Na_2O$ causes poor dimensional stability of the glass-ceramic, namely an expansion of +631 ppm when held at 1,500°F for 250 hours for Composition 59A. $Na_2O+K_2O$ in an amount of about 0.3 weight percent also adversely affects the stability as does $K_2O$ per se when present in such an amount. Thus, an important and essential feature of these compositions is that the weight percent of $Na_2O$ and $K_2O$, either alone or combined be no more than 0.2 weight percent. $Fe_2O_3$, when present as an impurity in an amount less than 0.5 weight percent, has substantially no effect on the stability properties of the glass-ceramic. F, on the other hand, even when present in an amount as low as 0.2 weight percent, imparted a 750 ppm change in Composition 34 after 100 hours at 1,500°F. See Table V, supra. Thus, fluorine should be present in amounts less than 0.1 percent, and preferably not at all.

To show the effect of the $Li_2O/Al_2O_3$ molar ratio on the properties of the compositions, five glasses were melted, drawn as ¼ inch rods and heat treated in accordance with the schedule set forth above with respect to the Table II compositions and where the finishing temperatures are set forth in the following Table VII. All compositions had a nucleating temperature of 1,350°F except for Composition 60, which was 1,300°F. Composition 37 was prepared from the following batch:

| Ingredient | Parts by Weight |
|---|---|
| Ottawa silica | 3612 |
| A-10 Alumina | 888 |
| Titanox | 70.5 |
| Sodium Antimonate | 20.5 |
| Lithium Carbonate | 487 |
| Lithium Chloride | 48 |
| Lithium Nitrate | 28 |
| Zinc Oxide | 70.6 |
| Zinc Zirconium Silicate | 176.5 |

The batch was melted at 2,980°F for twenty-two hours while being mechanically stirred. Other compositions coming within the scope of this embodiment of the invention were similarly made, except that the amounts of the ingredients varied accordingly. Those in the art will know how to make all of the compositions of the invention from the foregoing disclosure.

Dimensional stability and strengths of each glass-ceramic were then measured.

TABLE VII

| Composition No. | 37 | 38 | 39 | 60 |
|---|---|---|---|---|
| Ingredients (Moles) | | | | |
| $Li_2O$ | 0.8 | 0.7 | 0.6 | 0.4 |
| $Al_2O_3$ | 1 | 1 | 1 | 1 |
| $SiO_2$ | 7.0 | 6.5 | 6.5 | 6.5 |
| ZnO | .11 | .11 | .11 | .11 |
| Heat Treatment Temp.°F(Time,Hrs.) | 2100(2) | 2200(2) | 2200(2) | 2200(2) |
| Dimensional Stability Parts Per Million (Time, Hrs.) | | | | |
| at 1500°F (hrs) | −157(2000) | −13.1(25) | −164(1000) | 48(500) |
| at 1900°F (hrs) | — | — | −170(250 hr) | −174(250) −261(500) |
| Modulus of Rupture (psi room temp) | 16,100 | 16,700 | 16,600 | 14,100 |
| Coefficient of Thermal Expansion $\alpha \times 10^{+7}$ (0–700°C) | −2.7 | −1.9 | −1.5 | 35.8 |

Compositions 37, 38 and 39 have excellent stability after being subjected to the high temperatures for extended periods of time and also have high strengths. Composition 60 which has a low $Li_2O/Al_2O_3$ molar ratio has a very high coefficient of expansion which makes it completely unsatisfactory for purposes of the invention.

To show the effect of ZnO to the basic properties of the glass-ceramic, the following glass-ceramics were prepared from corresponding crystallizable glasses, drawn into ¼ inch rods and heat treated in accordance with the schedule set forth above with respect to the Table II compositions. The finishing temperatures are set forth in Table VIII. The nucleation temperatures are as follows: 1,250°F for Compositions 40 and 41; 1,300°F for Composition 42 and 1,350°F for the remaining four compositions.

TABLE VIII

| Composition No. | 40 | 41 | 37 | 42 | 61 | 62 | 63 |
|---|---|---|---|---|---|---|---|
| Ingredients (Moles) | | | | | | | |
| $Li_2O$ | 0.8 | 0.8 | 0.8 | 0.76 | 0.8 | 0.8 | 0.8 |
| $Al_2O_3$ | 1 | 1 | 1 | 1 | 1 | 1 | 1 |
| $SiO_2$ | 6.5 | 6.5 | 7.0 | 6.5 | 6.5 | 6.5 | 6.5 |
| ZnO | 0.25 | 0.17 | 0.11 | 0.07 | 0.04 | 0.02 | 0.01 |
| Molar Ratio $ZnO/Li_2O$ | 0.31 | 0.21 | 0.14 | 0.09 | 0.05 | .025 | .0125 |
| Heat Treatment Temp.°F (Time,Hrs.) | 2100(2) | 2100(2) | 2100(2) | 2200(2) | 2100(2) | 2100(2) | 2100(2) |
| Dimensional Stability Parts Per Million (Time, Hrs.) | | | | | | | |
| at 1500°F (hrs) | −95(500) | −32(100) | −157(2000) | −74(2000) | −147(500) | +4(250) | −9(250) |
| at 1900°F (hrs) | — | — | — | — | −119(1000) | +156(500) | −147(250) |
| Modulus of Rupture (psi room temp) | 20,100 | 13,800 | 16,100 | 15,100 | 13,400 | 10,100 | 9,900 |
| Coefficient of Thermal Expansion $\alpha \times 10^{+7}$ (0–700°C) | −1 | −.2 | −2.7 | −1.0 | +6.0 | −0.1 | −0.6 |

From the above table it can be seen that compositions 37, 40, 41, 42 and 61, which have a $SiO_2/Al_2O_3$ ratio of 0.8 and less have a molar ratio of $ZnO/Li_2O$ within the range of 0.04 to 0.5 and thus the presence of the ZnO affects and increases the modulus of rupture properties of the glass-ceramics. However, when the $ZnO/Li_2O$ molar ratio is outside of the range of 0.04 to 0.5, the resulting glass ceramics, while they have good high temperature properties, are no better than glass-ceramic compositions having no ZnO. Thus, in order to achieve the increase in modulus of rupture, the amount of ZnO must come within the critical ranges set forth above, both as to weight percent and as to molar ratios.

The most usual compositions of this embodiment of the invention are as set forth hereinbefore but with the weight percent ranges of $SiO_2$, $Al_2O_3$, $Li_2O$ and ZnO in the following narrow ranges:

| Ingredient | Weight Percent |
|---|---|
| $SiO_2$ | 58.2 – 78.4 |
| $Al_2O_3$ | 13.7 – 26.5 |
| $Li_2O$ | 3.2 – 6.9 |
| ZnO | 0.3 – 6.5 |

The effect resulting from too high a $SiO_2$ level in the compositions is seen from Table IX. The nucleation temperature for Compositions 55, 57 and 65 were 1,350°F and the finishing temperatures and times are set forth in Table IX. Again, the heat treating schedule was the same as that given for the Table II compositions.

TABLE IX

| Composition No. | 64 | 65 | 55 | 57 |
|---|---|---|---|---|
| Ingredients (Moles) | | | | |
| $Li_2O$ | 0.6 | 0.8 | 0.8 | 0.8 |
| $Al_2O_3$ | 1 | 1 | 1 | 1 |
| $SiO_2$ | 10 | 10 | 8 | 8 |
| ZnO | 0.11 | 0.11 | 0.11 | 0.056 |
| Heat Treatment Temp.°F(Time,Hrs.) | — | 2100(2) | 2200(2) | 2200(2) |
| Dimensional Stability Parts Per Million (Time,Hrs.) | | | | |
| at 1500°F | — | +49(25) | 20(10) | — |
| at 1900°F | — | 155(10) low strength | +23(10) | — |
| Modulus of Rupture (psi room temp) | — | 7,000 | 21,000 | 20,800 |
| Coefficient of Thermal Expansion $\alpha \times 10^{+7}$ (0–700°C) | — | +11 | −4.6 | −4.0 |
| Coefficient of Thermal Expansion $\alpha \times 10^{+7}$ (0–300°C) | — | +31 | — | — |

Composition 64 could not be properly crystallized and was a very weak product having a modulus of rupture of 2,000°–3,000 psi. Composition 65 has a very low modulus of rupture and a high coefficient of thermal expansion, both over the 0°–700°C and the 0°–300°C ranges. When the $SiO_2/Al_2O_3$ molar ratio was 8, however, as in Compositions 55 and 57, the strengths of the glass-ceramics tripled over that of composition 65 the expansion coefficients became very low.

The effect resulting from too low a $SiO_2$ level in the compositions is seen from Table X. While Compositions 51 and 54 have good high temperature properties, where the $Li_2O/Al_2O_3$ ratio is as low as 0.6 with low $SiO_2$ levels, the $SiO_2/Al_2O_3$ should not be lower than 4, because of the very poor forming properties of the glass. Composition 66, on the other hand, did not crystallize and broke during the heat treatment. The nucleation temperature for Compositions 51 and 54 was 1,350°F.

TABLE X

| Composition No. | 51 | 54 | 66 |
|---|---|---|---|
| Ingredients (Moles) | | | |
| $Li_2O$ | 0.6 | 0.6 | 0.6 |
| $Al_2O_3$ | 1.0 | 1.0 | 1.0 |
| $SiO_2$ | 4.3 | 3.5 | 4.3 |
| ZnO | 0.08 | 0.11 | 0.024 |
| Heat Treatment Temp.°F(Time,Hrs.) | 2200(2) | 2200 | — |
| Dimensional Stability Parts Per Million (Time, Hrs.) | | | |
| at 1500°F | −39(250) | −31(250) | — |
| at 1900°F | — | −88(250) | — |
| Modulus of Rupture (psi room temp) | 13,400 | 16,000 | — |
| Coefficient of Thermal Expansion $\alpha \times 10^{+7}$ (0–700°C) | +5.8 | +10.8 | — |

In all of the work set forth in the foregoing tables, five rods were drawn from each melt and the dimensional stability measurements are based on the average stability of the five rods. For the modulus of rupture tests, 10 rods were drawn from each melt and the strengths set forth in the tables is the average strength of the ten rods. The modulus of rupture tests were performed on a Dillon Universal Tester, Low Range Head, having a 4 point loading with a support span of 4 inches and a loading span of three-fourths inch. The rods were each 5½ inches in length and the loading rate adjusted so that the samples broke between 36 and 48 seconds. The 10 samples were abraded by tumbling for 15 minutes in a ball mill jar rotating at 75 rpm and containing 250 grams of 240 grit SiC.

Compositions 23–35 and 59–66, inclusive, referred to in the above tables have the following compositions expressed in weight percents:

Compositions coming within these critical ratios and having good thermal stability at 1,900°F are Nos.: 39, 48, 49, 51, 53–56.

A matrix for a regenerative heat exchanger as disclosed in the aforementioned U.S. Pat. application Ser. No. 30,859 was made utilizing composition 37 of the present invention. Such a matrix, broadly speaking, comprises integrally fused tubes forming a series of smooth longitudinal parallel passageways therethrough wherein the walls defining the passageways have (1) essentially zero porosity, (2) consist essentially of an inorganic crystallinne oxide material, (3) a maximum

TABLE XI

| Composition Nos. | 24 | 23 | 25 | 26 | 27 | 28 | 29 |
|---|---|---|---|---|---|---|---|
| Ingredients | | | | | | | |
| $SiO_2$ | 70.7 | 70.5 | 72.4 | 72.9 | 61 | 65.4 | 64.9 |
| $Al_2O_3$ | 20 | 19.9 | 20.5 | 20.6 | 27.8 | 25.8 | 25.6 |
| ZnO | — | — | — | — | — | — | — |
| $Li_2O$ | 5.9 | 6.1 | 3.6 | 3 | 7.7 | 5.3 | 6 |
| $TiO_2$ | 1.45 | 1.45 | 1.45 | 1.45 | 1.45 | 1.45 | 1.45 |
| $ZrO_2$ | 1.6 | 1.6 | 1.6 | 1.6 | 1.6 | 1.6 | 1.6 |
| $Sb_2O_3$ | 0.3 | 0.3 | 0.3 | 0.3 | 0.3 | 0.3 | 0.3 |
| $Na_2O$ | 0.1 | 0.1 | 0.1 | 0.1 | 0.1 | 0.1 | 0.1 |
| $K_2O$ | — | — | — | — | — | — | — |
| $Fe_2O_3$ | — | — | — | — | — | — | — |
| Composition Nos. | 30 | 31 | 32 | 33 | 34 | 35 | 59 |
| Ingredients | | | | | | | |
| $SiO_2$ | 80.5 | 79.8 | 70.6 | 70.2 | 70.6 | 71.3 | 72.8 |
| $Al_2O_3$ | 13.6 | 13.5 | 20 | 19.8 | 20 | 20.2 | 17.6 |
| ZnO | — | — | — | — | 1.7 | — | 1.7 |
| $Li_2O$ | 2.4 | 3.15 | 5.3 | 5.3 | 3.8 | 4.8 | 4.2 |
| $TiO_2$ | 1.45 | 1.45 | 1.45 | 1.45 | 1.45 | 1.45 | 1.4 |
| $ZrO_2$ | 1.6 | 1.60 | 1.6 | 1.6 | 1.6 | 1.60 | 1.6 |
| $Sb_2O_3$ | 0.3 | 0.3 | 0.3 | 0.3 | 0.3 | 0.3 | 0.3 |
| $Na_2O$ | 0.1 | 0.1 | 0.5 | 0.8 | 0.1 | 0.1 | 0.3 |
| $K_2O$ | — | — | 0.2 | 0.4 | — | — | — |
| $Fe_2O_3$ | — | — | — | — | — | — | — |
| $F_2$ | — | — | — | — | 0.3 | 0.2 | — |
| Composition Nos. | 60 | 61 | 62 | 63 | 64 | 65 | 66 |
| Ingredients | | | | | | | |
| $SiO_2$ | 73.5 | 72.5 | 72.7 | 72.9 | 79.3 | 78.8 | 65.6 |
| $Al_2O_3$ | 19 | 18.9 | 19 | 19 | 13.5 | 13.4 | 25.9 |
| ZnO | 1.7 | 0.6 | 0.3 | 0.1 | 1.3 | 1.2 | 0.5 |
| $Li_2O$ | 2.25 | 4.4 | 4.4 | 4.4 | 2.4 | 3.2 | 4.6 |
| $TiO_2$ | 1.45 | 1.45 | 1.45 | 1.45 | 1.45 | 1.45 | 1.45 |
| $ZrO_2$ | 1.6 | 1.6 | 1.6 | 1.6 | 1.6 | 1.6 | 1.6 |
| $Sb_2O_3$ | 0.3 | 0.3 | 0.3 | 0.3 | 0.3 | 0.3 | 0.3 |
| $Na_2O$ | 0.1 | 0.1 | 0.1 | 0.1 | 0.1 | 0.1 | 0.1 |

While glass-ceramics having high stability when exposed to temperatures as high as 1,900°F over extended periods of time are made from the $SiO_2$-$Al_2O_3$-$Li_2O$ compositions of the first embodiment of the present invention, and while glass-ceramics having greater strengths are produced by the $SiO_2$-$Al_2O_3$-$Li_2O$-ZnO compositions of the second embodiment of the invention, many of the latter compositions do not produce glass-ceramics which are thermally stable at the 1,900°F temperatures. However, a small group of compositions containing ZnO and coming within the second embodiment of the invention, do have the requisite thermal stability at 1,900°F over a long period of time. Such compositions can be defined as having:

A. 1. a $SiO_2$/$Al_2O_3$ molar ratio of 5–8
2. a $Li_2O$/$Al_2O_3$ molar ratio of 0.55–0.75
3. a ZnO/$Li_2O$ molar ratio of 0.04–0.5, and
4. a ZnO + $Li_2O$/$Al_2O_3$ molar ratio: $\leq 1$, or B. 1. a $SiO_2$/$Al_2O_3$ molar ratio of 4 to less than 5
2. a $Li_2O$/$Al_2O_3$ molar ratio of 0.55–0.75
3. a ZnO/$Li_2O$ molar ratio of 0.06–0.5, and
4. a ZnO + $Li_2O$/$Al_2O_3$ molar ratio $\leq 1$.

diameter of 0.1 inch, (4) a maximum thickness of about 0.03 to 0.002 inch through portions of the walls common to adjacent fused tubes, with the ratio of the diameter to such thickness being at least 3. The matrix has an open frontal area of at least 60% and the walls of the matrix have a thermal conductivity of less than 0.01 cal/cm/sec/cm²/°C. at 400°C.

Glass tubing made from Composition 37 above and having an inner diameter of .030 inches and a wall thickness of .0015 inches was cut into lengths 3½ inches long and each end was sealed, trapping air therein.

The sealed tubing was tightly packed parallel to the length of a mold lines with a layer of heat-resistant alumina-silica paper. The tubes within the mold were in a closely-packed parallel relationship with each other. The assembly was then heated in a kiln on the following schedule:

| Temperature | Time or Rate |
|---|---|
| Ambient to 1250°F | 300°F/hr. |
| Hold at 1250°F | 8 hrs. |
| 1250°F to 2100°F | 100°F/hr. |
| Hold at 2100°F | 2 hrs. |

-continued

| Temperature | Time or Rate |
|---|---|
| 2100°F to Room Temperature | 300°F/hr. |

After this heat treatment, the resulting glass-ceramic matrix was removed from the mold and the ends of the tubes opened by grinding. The foregoing heat treatment thermally in situ crystallized the glass and produced a glass-ceramic matrix. The heat treatment had fusion bonded the walls of each tube to those of adjacent tubes and reformed each tube to substantially hexagonal shape. The matrix was suitable as a heat regenerator for a gas turbine engine, able to withstand the operating temperature of at least 1,500°F for an extended period of time without any deleterious thermal instability occurring.

The above glass tubing of Composition 37 is also suitable for making the glass-ceramic recuperatore matrix disclosed in U.S. Pat. application Ser. No. 30,859 and in the U.S. Pat. application Ser. No. 146,665 filed May 25, 1971, as a divisional and continuation-in-part thereof. There, a plurality of layers of tubes are superimposed one above the other in successive parallel planes, the tubes within each plane being essentially parallel to each other and transverse to tubes in adjacent layers. When subjected to the same heat schedule described above with respect to the regenerator matrix, each tube becomes integrally fused to each adjacent parallel tube and each adjacent transverse tube. When, as preferred, the tubes are essentially fully expanded, each tube wall is a common wall with each tube adjacent thereto, including those in the same plane and those in adjacent parallel planes.

Moreover, when fully expanded, the passageways are essentially in the shape of a parallelogram, usually a square or a rectangle. After the heat treatment and the subsequent opening of the sealed ends, such as by grinding, an integral glass-ceramic recuperator matrix is obtained.

Using glass tubing formed from the compositions of the present invention, such as Composition 37, a core assembly for a thermal reactor for receiving the flow of hot gas effluents from a combustion engine, such as that disclosed in the aforementioned Zmudz et al U.S. Pat. application filed Mar. 23, 1971 can be made.

Such glass tubing is tightly packed together about a tubular member in parallel relationship, with each end of the tubing being sealed. The outer periphery of the assembly is then constrained from outward movement in a direction perpendicular to the longitudinal passageways formed by the tubing and the tubular member. The assembly is then subjected to a heat schedule such that the tubing becomes softened and the air entrapped therein expands and urges the tubes into tight contact with adjacent tubes. A glass-ceramic matrix comprising a plurality of expanded tubes fusion-bonded together and to the tubular member is thus formed. The sealed ends of the tubing are opened and the matrix can then be utilized in the manner disclosed in the aforesaid Zmuda et al application to make the thermal reactor for a combustion engine.

What is claimed is:

1. A thermally crystallizable glass capable of being thermally in situ crystallized to a glass-ceramic which is thermally stable at temperatures of about 1,500°F for at least 1000 hours and maintains its modulus of rupture of at least about 10,000 psi at such temperatures for said times, said glass consisting essentially of the following ingredients:

| Ingredients | Weight Percent |
|---|---|
| $SiO_2$ | 55 – 80 |
| $Al_2O_3$ | 12 – 27 |
| $Li_2O$ | 3.2 – 7.6 |
| Nucleating Agent | 3 – 9 | wherein said nucleating agent is a mixture of $TiO_2$ + $ZrO_2$, wherein the $ZrO_2$ does not exceed 3 weight percent, but is at least 0.5 weight percent, wherein the $SiO_2/Al_2O_3$ molar ratio is from 4 to 10 and wherein
  a. when the $SiO_2/Al_2O_3$ molar ratio is from 4 to less than 5, the $Li_2O/Al_2O_3$ molar ratio is from 0.75 to 0.97; and
  b. when the $SiO_2/Al_2O_3$ molar ratio is from 5 to 7.5, the $Li_2O/Al_2O_3$ molar ratio is from 0.65 to 0.97; and
  c. when the $SiO_2/Al_2O_3$ molar ratio is more than 7.5 and less than 9, the $Li_2O/Al_2O_3$ molar ratio is from 0.8 to 0.97; and
  d. when the $SiO_2/Al_2O_3$ molar ratio is more than 9 and up to 10, the $Li_2O/Al_2O_3$ molar ratio is from 0.87 to 0.97.

2. The thermally crystallizable glass as defined in claim 1, wherein at least 98% by weight of said glass consists of said $SiO_2$, $Al_2O_3$, $Li_2O$ and nucleating agent.

3. A thermally crystallizable glass as defined in claim 1, wherein said glass contains in weight percent no more than 0.5 $K_2O$, or 0.5 $Na_2O$, or 0.5 of a mixture of ($Na_2O+K_2O$).

4. A thermally crystallizable glass as defined in claim 1, wherein said glass contains in weight percent no more than 0.25 $K_2O$, or 0.25 $Na_2O$, or 0.25 of a mixture of ($Na_2O+K_2O$).

5. The thermally crystallizable glass as defined in claim 1, wherein said glass consists of said $SiO_2$, $Al_2O_3$, $Li_2O$ and nucleating agent.

6. The thermally crystallizable glass as defined in claim 1, wherein $ZrO_2$ is present in an amount of 0.5 to 2.8 weight percent of said composition.

7. A glass-ceramic article thermally stable at temperatures of about 1,500°F for at least 1,000 hours and retaining its modulus of rupture of at least about 10,000 psi when subjected to said temperatures for said times, said article being formed by thermally in situ crystallizing a glass consisting essentially of the following ingredients:

| Ingredients | Weight Percent |
|---|---|
| $SiO_2$ | 55 – 80 |
| $Al_2O_3$ | 12 – 27 |
| $Li_2O$ | 3.2 – 7.6 |
| Nucleating Agent | 3 – 9 | wherein said nucleating agent is a mixture of $TiO_2$ + $ZrO_2$, wherein the $ZrO_2$ does not exceed 3 weight percent, but is at least 0.5 weight percent, wherein the $SiO_2/Al_2O_3$ molar ratio is from 4 to 10, and wherein
  a. when the $SiO_2/Al_2O_3$ molar ratio is from 4 to less than 5, the $Li_2O/Al_2O_3$ molar ratio is from 0.75 to 0.97; and b. when the $SiO_2/Al_2O_3$ molar ratio is from 5 to 7.5, the $Li_2O/Al_2O_3$ molar ratio is from 0.65 to 0.97; and c. when the $SiO_2/Al_2O_3$ molar ratio is more than 7.5 and less than 9, the $Li_2O/Al_2O_3$ molar ratio is from 0.8 to 0.97; and d. when the $SiO_2/Al_2O_3$ molar ratio is more than 9 and up to 10, the $Li_2O/Al_2O_3$ molar ratio is from 0.87 to 0.97, said glass-ceramic article having a coefficient of linear thermal expansion of $-12$ to $+12 \times 10^{-7}$ (0°–700°C).

8. The glass-ceramic article as defined in claim 7, wherein at least 98% by weight of said glass-ceramic consists of said $SiO_2$, $Al_2O_3$, $Li_2O$ and nucleating agent.

9. A glass-ceramic article as defined in claim 7, wherein said glass-ceramic contains in weight percent no more than 0.5 $K_2O$, or 0.5 $Na_2O$, or 0.5 of a mixture of ($Na_2O+K_2O$).

10. A glass-ceramic article as defined in claim 7, which is thermally stable at temperatures of about 1,900°F for at least 1000 hours, wherein said glass-ceramic contains in weight percent no more than 0.25 $K_2O$, or 0.25 $Na_2O$, or 0.25 of a mixture of ($Na_2O+K_2O$).

11. The glass-ceramic article as defined in claim 7, wherein said glass-ceramic consists of said $SiO_2$, $Al_2O_3$, $Li_2O$ and nucleating agent.

12. The glass-ceramic article as defined in claim 7, wherein $ZrO_2$ is present in an amount of 0.5 to 2.8 weight percent of said composition.

13. The glass-ceramic article as defined in claim 7, wherein said glass-ceramic has a coefficient of linear thermal expansion of $-3$ to $+3 \times 10^{-7}$ (0°–700°C).

14. The glass-ceramic article as defined in claim 7, wherein said glass-ceramic has a coefficient of linear thermal expansion of $-0.5$ to $+0.5 \times 10^{-7}$ (0°–700°C).

15. A thermally crystallizable glass capable of being thermally in situ crystallized to a glass-ceramic which is thermally stable at temperatures of about 1,500°F for at least 1,000 hours and maintains its modulus of rupture of at least 10,000 psi at such temperatures for said times, said glass consisting essentially of the following ingredients:

| Ingredients | Weight Percent |
|---|---|
| $SiO_2$ | 63 – 78.5 |
| $Al_2O_3$ | 13.8 – 23 |
| $Li_2O$ | 3.5 – 6.5 |
| Nucleating Agent | 3 – 9 | wherein said nucleating agent is a mixture of $TiO_2$ plus $ZrO_2$, wherein the $ZrO_2$ does not exceed 3 weight percent but is at least 0.5 weight percent, and wherein the $SiO_2/Al_2O_3$ molar ratio is from 5 to less than 9, and wherein a. when the $SiO_2/Al_2O_3$ molar ratio is from 5 to less than 7.5, the $Li_2O/Al_2O_3$ molar ratio is from 0.75 to 0.97; and b. when the $SiO_2/Al_2O_3$ molar ratio is from 7.5 to less than 9, the $Li_2O/Al_2O_3$ molar ratio is from 0.87 to 0.97.

16. A glass-ceramic article thermally stable at temperatures of about 1,900°F for at least 1,000 hours and retaining its modulus of rupture of at least about 10,000 psi when subjected to said temperatures for said times, said article being formed by thermally in situ crystallizing a glass consisting essentially of the following ingredients:

| Ingredients | Weight Percent |
|---|---|
| $SiO_2$ | 63 – 78.5 |
| $Al_2O_3$ | 13.8 – 23 |
| $Li_2O$ | 3.5 – 6.5 |
| Nucleating Agent | 3 – 9 | wherein said nucleating agent is a mixture of $TiO_2$ plus $ZrO_2$, wherein the $ZrO_2$ does not exceed 3 weight percent but is at least 0.5 weight percent, and wherein the $SiO_2/Al_2O_3$ molar ratio is from 5 to less than 9, and wherein a. when the $SiO_2/Al_2O_3$ molar ratio is from 5 to less than 7.5, the $Li_2O/Al_2O_3$ molar ratio is from 0.75 to 0.97; and b. when the $SiO_2/Al_2O_3$ molar ratio is from 7.5 to less than 9, the $Li_2O/Al_2O_3$ molar ratio is from 0.87 to 0.97, said glass-ceramic having a coefficient of linear thermal expansion of $-12$ to $+12 \times 10^{-7}$ (0°–700°C).

17. A glass-ceramic article thermally stable at temperatures of about 1,900°F for at least 1000 hours and retaining its modulus of rupture of at least about 10,000 psi when subjected to said temperatures for said times, said article being formed by thermally in situ crystallizing a glass consisting essentially of the following ingredients:

| Ingredients | Weight Percent |
|---|---|
| $SiO_2$ | 62.8 – 80 |
| $Al_2O_3$ | 12.7 – 26.7 |
| $Li_2O$ | 3.2 – 7.6 |
| Nucleating Agent | 3 – 9 | wherein said nucleating agent is a mixture of $TiO_2$ + $ZrO_2$, wherein the $ZrO_2$ does not exceed 3 weight percent, but is at least 0.5 weight percent, wherein the $SiO_2/Al_2O_3$ molar ratio is from 4 to 10, and wherein a. when the $SiO_2/Al_2O_3$ molar ratio is from 4 to less than 5, the $Li_2O/Al_2O_3$ molar ratio is from 0.75 to 0.97; and b. when the $SiO_2/Al_2O_3$ molar ratio is from 5 to 7.5, the $Li_2O/Al_2O_3$ molar ratio is from 0.65 to 0.97; and c. when the $SiO_2/Al_2O_3$ molar ratio is more than 7.5 and less than 9, the $Li_2O/Al_2O_3$ molar ratio is from 0.8 to 0.97; and d. when the $SiO_2/Al_2O_3$ molar ratio is more than 9 and up to 10, the $Li_2O/Al_2O_3$ molar ratio is from 0.87 to 0.97, said glass-ceramic article having a coefficient of linear thermal expansion of $-12$ to $+12 \times 10^{-7}$ (0°–700°C).

18. A thermally crystallizable glass capable of being thermally in situ crystallized to a glass-ceramic which is thermally stable at temperatures of about 1,500°F for at least 1000 hours, said glass consisting essentially of the following ingredients:

| Ingredients | Weight Percent |
|---|---|
| $SiO_2$ | 52 – 78.4 |
| $Al_2O_3$ | 12.8 – 27.5 |
| $Li_2O$ | 2.4 – 7 |
| ZnO | 0.25 – 6.7 |

-continued

| Ingredients | Weight Percent |
| --- | --- |
| Nucleating Agent | 3 – 9 | wherein said nucleating agent is selected from the group consisting of $ZrO_2$ and a mixture of $TiO_2$ and $ZrO_2$ and wherein the $ZrO_2$ is present in an amount not in excess of 3% by weight, but is at least 0.5 weight percent, wherein the $SiO_2/Al_2O_3$ molar ratio is from 4 to 9 and the $ZnO + Li_2O/Al_2O_3$ molar ratio is ≤ 1; and
 a. when the $SiO_2/Al_2O_3$ molar ratio is from 4 to less than 5, the $Li_2O/Al_2O_3$ molar ratio is from 0.55 to 0.91, and the $ZnO/Li_2O$ molar ratio is from 0.06 to 0.5; and
 b. when the $SiO_2/Al_2O_3$ molar ratio is from 5 to 8, the $Li_2O/Al_2O_3$ molar ratio is from 0.55 to 0.93, and the $ZnO/Li_2O$ molar ratio is from 0.04 to 0.5; and
 c. when the $SiO_2/Al_2O_3$ molar ratio is from more than 8 up to 9, the $Li_2O/Al_2O_3$ molar ratio is from 0.8 to 0.93, and the $ZnO/Li_2O$ molar ratio is from 0.04 to 0.5; and
 d. the glass contains in weight percent no more than 0.2 $K_2O$, or 0.2 $Na_2O$, or 0.2 ($Na_2O + K_2O$).

19. The thermally crystallizable glass as defined in claim 18 wherein at least 98% by weight of said glass consists of said $SiO_2$, $Al_2O_3$, $Li_2O$, ZnO and nucleating agent.

20. The thermally crystallizable glass as defined in claim 18 wherein the nucleating agent is a mixture of $ZrO_2$ plus $TiO_2$ and said $ZrO_2$ is present in an amount of 0.5 to 2.8 weight percent of said composition.

21. A glass-ceramic article dimensionally stable at temperatures up to about 1,500°F for at least 1,000 hours and retaining its modulus of rupture of at least about 13,00 psi when subjected to said temperatures for said times, said article being formed by thermally in situ crystallizing a glass consisting essentially of the following ingredients

| Ingredients | Weight Percent |
| --- | --- |
| $SiO_2$ | 52 – 78.4 |
| $Al_2O_3$ | 12.8 – 27.5 |
| $Li_2O$ | 2.4 – 7 |
| ZnO | 0.25 – 6.7 |
| Nucleating Agent | 3 – 9 | wherein said nucleating agent is selected from the group consisting of $ZrO_2$ and a mixture of $TiO_2$ and $ZrO_2$ and wherein the $ZrO_2$ is present in an amount not in excess of 3% by weight, but is at least 0.5 weight percent, wherein the $ZnO + Li_2O/Al_2O_3$ molar ratio is 1, and wherein the $SiO_2/Al_2O_3$ molar ratio is from 4 to 9 and
 a. when the $SiO_2/Al_2O_3$ molar ratio is from 4 to less than 5, the $Li_2O/Al_2O_3$ molar ratio is from 0.55 to 0.91, and the $ZnO/Li_2O$ molar ratio is from 0.06 to 0.5; and
 b. when the $SiO_2/Al_2O_3$ molar ratio is from 5 to 8, the $Li_2O/Al_2O_3$ molar ratio is from 0.55 to 0.93, and the $ZnO/Li_2O$ molar ratio is from 0.04 to 0.5; and
 c. when the $SiO_2/Al_2O_3$ molar ratio is from more than 8; up to 9, the $Li_2O/Al_2O_3$ molar ratio is from 0.8 to 0.93 and the $ZnO/Li_2O$ molar ratio is from 0.04 to 0.5; and
 d. the glass and resulting glass-ceramic contains in weight percent no more than 0.2 $K_2O$, or 0.2 $Na_2O$, or 0.2 ($Na_2O + K_2O$),
said glass-ceramic having a coefficient of linear thermal expansion of −12 to +12 × $10^{-7}$ (0°–700°C).

22. The glass-ceramic article as defined in claim 21 wherein at least 98% by weight of said glass-ceramic consists of said $SiO_2$, $Al_2O_3$, $Li_2O$, ZnO and nucleating agent.

23. The glass-ceramic article as defined in claim 21 wherein the nucleating agent is a mixture of $ZrO_2$ plus $TiO_2$ and said $ZrO_2$ is present in an amount of 0.5 to 2.8 weight percent of said composition.

24. The glass-ceramic article as defined in claim 21 wherein said glass-ceramic has a coefficient of linear thermal expansion of −3 to +3 ×$10^{-7}$(0°–700°C.).

25. A thermally crystallizable glass capable of being thermally in situ crystallized to a glass-ceramic which is thermally stable at temperatures of about 1,500°F for at least 1,000 hours, said glass consisting essentially of the following ingredients:

| Ingredients | Weight Percent |
| --- | --- |
| $SiO_2$ | 58.2 – 78.4 |
| $Al_2O_3$ | 13.7 – 26.5 |
| $Li_2O$ | 3.2 – 6.9 |
| ZnO | 0.3 – 6.5 |
| Nucleating Agent | 3 – 9 | wherein said nucleating agent is selected from the group consisting of $ZrO_2$ and a mixture of $TiO_2$ and $ZrO_2$ and wherein the $ZrO_2$ is present in an amount not in excess of 3% by weight, but is at least 0.5 weight percent, wherein the $SiO_2/Al_2O_3$ molar ratio is from 4 to 9 and the $ZnO + Li_2O/Al_2O_3$ molar ratio is 1, and
 a. when the $SiO_2/Al_2O_3$ molar ratio is from 4 to less than 5, the $Li_2O/Al_2O_3$ molar ratio is from 0.55 to 0.91, and the $ZnO/Li_2O$ molar ratio is from 0.06 to 0.5;
 b. when the $SiO_2/Al_2O_3$ molar ratio is from 5 to 8, the $Li_2O/Al_2O_3$ molar ratio is from 0.55 to 0.93, and the $ZnO/Li_2O$ molar ratio from 0.04 to 0.5; and
 c. when the $SiO_2O/Al_2O_3$ molar ratio is from more than 8 up to 9, the $Li_2O/Al_2O_3$ molar ratio is from 0.8 to 0.93 and the $ZnO/Li_2O$ molar ratio is from 0.04 to 0.5; and
 d. the glass contains in weight percent no more than 0.2 $K_2O$, or 0.2 $Na_2O$, or 0.2 ($Na_2O + K_2O$).

26. The thermally crystallizable glass as defined in claim 25 wherein at least 98% by weight of said glass consists of said $SiO_2$, $Al_2O_3$, ZnO and nucleating agent.

27. A thermally crystallizable glass according to claim 18 capable of being thermally in situ crystallized to a glass-ceramic which is thermally stable at temperatures of about 1,900°F for at least 1,000 hours, said glass being selected from the group consisting of
 A. glass having
  a. a $SiO_2/Al_2O_3$ molar ratio of 5–8
  b. a $Li_2O/Al_2O_3$ molar ratio of 0.55 to 0.75, and
  c. a $ZnO/Li_2O$ molar ratio of 0.04 − 0.5
 B. a glass having
  a. a $SiO_2/Al_2O_3$ molar ratio of 4 to less than 5
  b. a $Li_2O/Al_2O_3$ molar ratio of 0.55 − 0.75, and
  c. a $ZnO/Li_2O$ molar ratio of 0.06 − 0.5.

28. The glass-ceramic article of claim 16 wherein said ceramic has a dimensional stability of less than 250 parts per million after being subjected to a temperature of 1,900°F for at least 1,000 hours.

29. The glass-ceramic article of claim 21 wherein said ceramic has a dimensional stability of less than 250 parts per million after being subjected to a temperature of 1,500°F for at least 1,000 hours.

30. The glass-ceramic article of claim 29 wherein said dimensional stability is retained after said article is subjected to said 1,500°F temperature for 2,000 hours.

31. A glass-ceramic according to claim 21 dimensionally stable at temperatures of about 1,900°F for at least 1,000 hours and maintaining its modulus of rupture of at least 13,000 psi when subjected to such temperatures for said times, said article being formed by thermally in situ crystallizing a glass selected from the group consisting of
A. a glass having
   a. a $SiO_2/Al_2O_3$ molar ratio of 5–8
   b. a $Li_2O/Al_2O_3$ molar ratio of 0.55 to 0.75
   c. a $ZnO/Li_2O$ molar ratio of 0.04 – 0.5, and
   d. a $ZnO+Li_2O/Al_2O_3$ molar ratio $\leq 1$; and
B. a glass having
   a. a $SiO_2/Al_2O_3$ molar ratio of 4 to less than 5
   b. a $Li_2O/Al_2O_3$ molar ratio of 0.55 – 0.75
   c. a $ZnO/Li_2O$ molar ratio of 0.06 – 0.5, and
   d. a $ZnO+Li_2O/Al_2O_3$ molar ratio $\leq 1$
said glass-ceramic having a coefficient of linear thermal expansion of $-12$ to $+12 \times 10^{-7}$ (0°–700°C.).

32. A thermally crystallizable glass capable of being thermally in situ crystallized to a glass-ceramic which is thermally stable at temperatures of about 1,500°F for at least 1,000 hours and maintains its modulus of rupture of at least about 10,000 psi at such temperatures for said times, said glass consisting of the following ingredients, exclusive of fining agents:

| Ingredients | Weight Percent |
|---|---|
| $SiO_2$ | 55 – 80 |
| $Al_2O_3$ | 12 – 27 |
| $Li_2O$ | 3.2 – 7.6 |
| Nucleating Agent | 3 – 9 | wherein said nucleating agent is a mixture of $TiO_2$ + $ZrO_2$, wherein the $ZrO_2$ does not exceed 3 weight percent, but is at least 0.5 weight percent, wherein the $SiO_2/Al_2O_3$ molar ratio is from 4 to 10 and wherein
   a. when the $SiO_2/Al_2O_3$ molar ratio is from 4 to less than 5, the $Li_2O/Al_2O_3$ molar ratio is from 0.75 to 0.97; and
   b. when the $SiO_2/Al_2O_3$ molar ratio is from 5 to 7.5, the $Li_2O/Al_2O_3$ molar ratio is from 0.65 to 0.97; and
   c. when the $SiO_2/Al_2O_3$ molar ratio is more than 7.5 and less than 9, the $Li_2O/Al_2O_3$ molar ratio is from 0.8 to 0.97; and
   d. when the $SiO_2/Al_2O_3$ molar ratio is more than 9 and up to 10, to $Li_2O/Al_2O_3$ molar ratio is from 0.87 to 0.97.

33. A glass-ceramic article thermally stable at temperatures of about 1,500°F for at least 1,000 hours and retaining its modulus of rupture of at least about 10,000 psi when subjected to said temperatures for said times, said article being formed by thermally in situ crystallizing a glass consisting of the following ingredients, exclusive of fining agents:

| Ingredients | Weight Percent |
|---|---|
| $SiO_2$ | 55 – 80 |
| $Al_2O_3$ | 15 – 27 |
| $Li_2O$ | 3.2 – 7.6 |
| Nucleating Agent | 3 – 9 | wherein said nucleating agent is a mixture of $TiO_2$ + $ZrO_2$, wherein the $ZrO_2$ does not exceed 3 weight percent, but is at least 0.5 weight percent, wherein the $SiO_2/Al_2O_3$ molar ratio is from 4 to 10, and wherein
   a. when the $SiO_2/Al_2O_3$ molar ratio is from 4 to less than 5, the $Li_2O/Al_2O_3$ molar ratio is from 0.75 to 0.97; and
   b. when the $SiO_2/Al_2O_3$ molar ratio is from 5 to 7.5 the $Li_2O/Al_2O_3$ molar ratio is from 0.67 to 97; and
   c. when the $SiO_2/Al_2O_3$ molar ratio is more than 7.5 and less than 9, the $Li_2O/Al_2O_3$ molar ratio is from 0.8 to 0.97; and
   d. when the $SiO_2/Al_2O_3$ molar ratio is more than 9 and up to 10, the $Li_2O/Al_2O_3$ molar ratio is from 0.87 to 0.97.
said glass-ceramic article having a coefficient of linear thermal expansion of $-12$ to $+12 \times 10^{-7}$ (0°–700°C).

34. A thermally crystallizable glass capable of being thermally in situ crystallized to a glass-ceramic which is thermally stable at temperatures of about 1,500°F for at least 1,000 hours, said glass consisting of the following ingredients, exclusive of fining agents:

| Ingredients | Weight Percent |
|---|---|
| $SiO_2$ | 52 – 78.4 |
| $Al_2O_3$ | 12.8 – 27.5 |
| $Li_2O$ | 2.4 – 7 |
| ZnO | 0.25 – 6.7 |
| Nucleating Agent | 3 – 9 | wherein said nucleating agent is selected from the group consisting of $ZrO_2$ and a mixture of $TiO_2$ and $ZrO_2$ and wherein the $ZrO_2$ is present in an amount not in excess of 3% by weight, but is at least 0.5 weight percent, wherein the $SiO_2/Al_2O_3$ molar ratio is from 4 to 9 and the $ZnO + Li_2O/Al_2O_3$ molar ratio is 1, and
   a. when the $SiO_2/Al_2O_3$ molar ratio is from 4 to less than 5, the $Li_2O/Al_2O_3$ molar ratio is from 0.55 to 0.91, and the $ZnO/Li_2O$ molar ratio is from 0.06 to 0.5; and
   b. when the $SiO_2/Al_2O_3$ molar ratio is from 5 to 8, the $Li_2O/Al_2O_3$ molar ratio is from 0.55 to 0.93, and the $ZnO/Li_2O$ molar ratio is from 0.04 to 0.5; and
   c. when the $SiO_2/Al_2O_3$ molar ratio is from more than 8 up to 9, the $Li_2O/Al_2O_3$ molar ratio is from 0.8 to 0.93, and the $ZnO/Li_2O$ molar ratio is from 0.04 to 0.5; and
   d. the glass contains in weight percent no more than 0.2 $K_2O$, or 0.2 $Na_2O$, or 0.2 ($Na_2O + K_2O$).

35. A glass-ceramic article dimensionally stable at temperatures up to about 1,500°F for at least 1,000 hours and retaining its modulus of rupture of at least about 13,000 psi when subjected to said temperatures for said times, said article being formed by thermally in situ crystallizing a glass consisting of the following ingredients, exclusive of fining agents:

| Ingredients | Weight Percent |
|---|---|
| $SiO_2$ | 52 – 78.4 |
| $Al_2O_3$ | 12.8 – 27.5 |
| $Li_2O$ | 2.4 – 7 |

| Ingredients | Weight Percent | |
|---|---|---|
| ZnO | 0.25 | 6.7 |
| Nucleating Agent | 3 | 9 | wherein said nucleating agent is selected from the group consisting of $ZrO_2$ and a mixture of $TiO_2$ and $ZrO_2$ and wherein the $ZrO_2$ is present in an amount not in excess of 3% by weight, but is at least 0.5 weight percent, wherein the $ZnO + Li_2O/Al_2O_3$ molar ratio is 1, and wherein the $SiO_2/Al_2O_3$ molar ratio is from 4 to 9 and a. when the $SiO_2/Al_2O_3$ molar ratio is from 4 to less than 5, the $Li_2O/Al_2O_3$ molar ratio is from 0.55 to 0.91, and the $ZnO/Li_2O$ molar ratio is from 0.06 to 0.5; and b. when the $SiO_2/Al_2O_3$ molar ratio is from 5 to 8, the $Li_2O/Al_2O_3$ molar ratio is from 0.55 to 0.93 and the $ZnO/Li_2O$ molar ratio is from 0.04 to 0.5; and c. when the $SiO_2/Al_2O_3$ molar ratio is from more than 8 up to 9, the $Li_2O/Al_2O_3$ molar ratio is from 0.8 to 0.93 and the $ZnO/Li_2O$ molar ratio is from 0.04 to 0.5; and d. the glass resulting glass-ceramic contains in weight percent no more than 0.2 $K_2O$, or 0.2 $Na_2O$ or 0.2 ($Na_2O + K_2O$).

said glass-ceramic having a coefficient of linear thermal expansion of $-12$ to $+12 \times 10^{-7}$ (0°–700°C).

* * * * *

UNITED STATES PATENT OFFICE
CERTIFICATE OF CORRECTION

PATENT NO. : 3,970,463
DATED : July 20, 1976
INVENTOR(S) : Jerry L. Planchock, Daniel R. Stewart, Thomas W. Brock It is certified that error appears in the above-identified patent and that said Letters Patent are hereby corrected as shown below:

Col. 11, Table VI, line 17, under "ingredients (weight percent)", change "SiO$_2$Al$_2$O$_3$" to --- SiO$_2$/Al$_2$O$_3$ ---.
Col. 16, line 35, after "65" insert --- while ---.
Col. 18, line 12, "crystallinne" should be --- crystalline ---.
Col. 19, line 20, "recuperatore" should be --- recuperator ---.
Col. 23, Claim 21, line 38, "13,00" should be --- 13,000 ---; line 56, before "1", insert --- $\leq$ ---.
Col. 24, Claim 25, line 36, after "is" insert --- $\leq$ ---.
Col. 24, Claim 26, line 53, after "Al$_2$O$_3$" insert --- Li$_2$O ---.
Col. 24, Claim 27, line 59, after "A." insert --- a ---.
Col. 25, Claim 31, line 18, after "a." insert --- a ---.
Col. 26, Claim 34, line 43, after "is" insert --- $\leq$ ---.
Col. 27, Claim 35, line 13, before "1" insert --- $\leq$ ---.

Signed and Sealed this

Eighteenth Day of January 1977

[SEAL]

Attest:

RUTH C. MASON
Attesting Officer

C. MARSHALL DANN
Commissioner of Patents and Trademarks